Patented Jan. 21, 1941

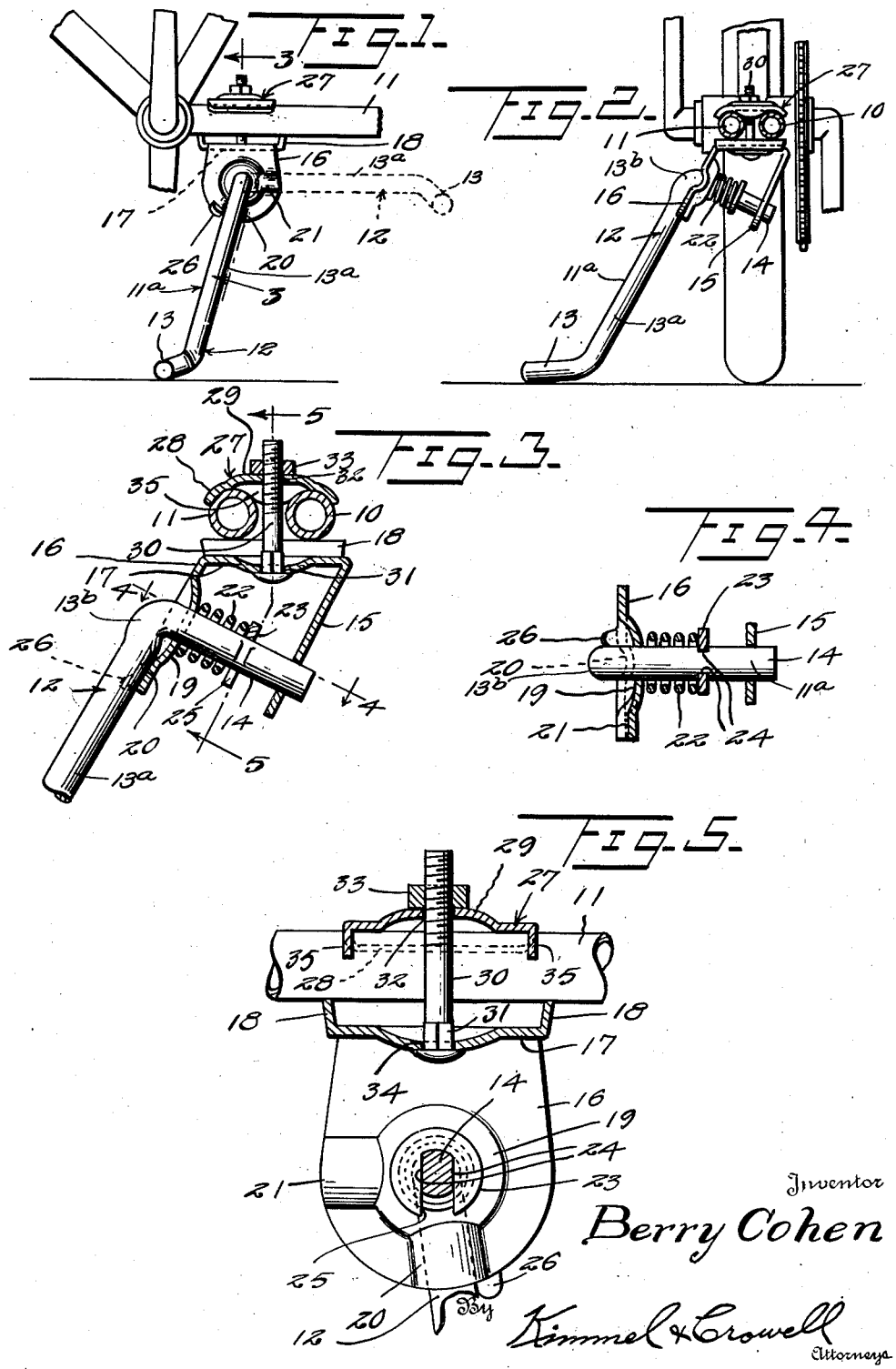

2,229,551

UNITED STATES PATENT OFFICE 2,229,551

BICYCLE STAND

Berry Cohen, Atlanta, Ga.

Application March 4, 1939, Serial No. 259,915

1 Claim. (Cl. 280—301)

This invention relates to bicycle stands and is an improvement over the bicycle stand embodied in my prior Patent No. 1,984,299, issued December 11, 1934.

An object of this invention is to provide a stand or support which may be clamped onto the present parts of a bicycle which may be readily moved to an operative position and which when in an inoperative position will be disposed out of the way so as not to interfere with the normal operation of the bicycle.

Another object of this invention is to provide a bicycle stand including a supporting leg or member which is yieldably secured to the bicycle adjacent the driving sprocket thereof, the supporting leg or member being so secured to the bicycle as to eliminate the necessity of machining a number of parts in order to provide the necessary structure.

A further object of this invention is to provide a stand structure wherein the attaching means therefore may be formed out of sheet metal which may be stamped to the desired configuration.

To the foregoing objects and to others which may hereinafter appear, the invention consists of the novel construction, combination and arrangement of parts as will be more specifically referred to and illustrated in the accompanying drawing, wherein is shown an embodiment of this invention, but is to be understood that changes, variations and modifications may be resorted to which fall within the scope of the invention as claimed.

In the drawing:

Figure 1 is a detail side elevation of a bicycle stand constructed according to an embodiment of this invention mounted on a bicycle which is shown in fragmentary form, Figure 2 is a detail rear elevation of the device in extended form, Figure 3 is a fragmentary sectional view taken on the line 3—3 of Figure 1, Figure 4 is a sectional view taken on the line 4—4 of Figure 3, and Figure 5 is a sectional view taken on the line 5—5 of Figure 3.

Referring to the drawing, the letter F designates generally the frame structure of a bicycle and the numerals 10 and 11 designate a pair of horizontally disposed tubular frame bars which are secured at their forward ends to the hub or bearing housing for the main driving sprocket.

In order to provide a means whereby the bicycle may be supported in substantially an upright position, I have provided a one-piece supporting element 11$^a$ formed of an elongated upstanding leg part 12 inclining outwardly from its inner to its outer end and a shaft part 14 inclining downwardly throughout with respect to the horizontal from its outer to its inner end. The leg part 12 includes an outer or lower end terminal portion 13, an intermediate portion 13$^a$ and an inner or upper terminal portion 13$^b$. The portion 13 is of materially greater length than the portions 13, 13$^b$ and inclines outwardly throughout from portion 13$^b$ to portion 13. The intermediate portion 13$^a$ merges at its lower or outer end into the inner or upper end of portion 13 and at its upper or inner end merges into the lower or outer end of portion 13$^b$. The portion 13 is angularly disposed with respect to the lower or outer end of and inclines downwardly throughout from its point of mergence with portion 13$^a$ and constitutes a foot portion. The portion 13$^b$ is offset outwardly relative to the inner or upper end of portion 13$^a$ and is substantially of elbow-shape in contour. The upper or inner end of the portion 13$^b$ merges into the outer or upper end of the shaft part 14. The said leg part and the said shaft part will be hereinafter referred to respectively as a leg and as a shaft 14 which is rotatably carried by a pair of downwardly and laterally inclined ears or hangers 15 and 16. The ears 15 and 16 are formed integral with a plate member 17 provided at its opposite edges with upturned flanges 18 forming a lower clamping member adapted to engage beneath the two frame members 10 and 11.

The ear 16 is provided with an inwardly dished central portion 19 through the center of which the shaft 14 rotatably engages and the ear 16 is also provided with a pair of detents or concave seats 20 and 21 which are in communication with the concave side of the dished portion 19 and are radial to the axial center of the shaft 14. A spring member 22 is disposed about the shaft 14 and at one end bears against the convex or inner side of the dished portion 19 and at the other end bears against a washer or collar 23. The shaft 14 is provided with opposed slots 24 and the collar 23 is provided with a slot 25 opening through the marginal edge thereof so that the washer or collar 23 may be seated in the slots 24 in order to tension the spring 22 and resiliently urge the supporting leg 12 against the outer face of the ear 16.

The ear 16 is provided with a stop lug 26 which is adjacent one edge of the recess or seat 20 so as to limit the swinging movement of the supporting member 12 in one direction. A second clamping member comprising a plate 27 having downturned end portions 28 is adapted to engage the upper sides of the tubular members 10 and 11 with the arcuate or curved portions 28 snugly engaging about the curved upper edges of the tubular members 10 and 11. The clamping plate 27 is provided with a longitudinally extending detent or dished portion 29 which serves as a bracing means and a clamping bolt 30 extends through an opening 31 provided in the lower plate 17 and through an opening 32 provided in the plate 27. A nut 33 is threaded onto the upper end of the bolt 30 and provides a means for detachably securing the clamping members 17 and 27 onto the tubular frame members 10 and 11. Preferably the bolt 30 is provided with a squared shank portion 34 which snugly engages in the squared opening 31 so that the bolt 30 is non-rotatable relative to the lower clamping plate 17.

The upper clamping plate 27 is provided on the opposite longitudinal edges thereof with depending flanges 35 which are shorter in length than the clamping plate 27 and which are adapted to engage between the two tubular members 10 and 11 so as to thereby hold the upper plate 27 against lateral movement relative to the tubular members 10 and 11.

In the use and operation of this stand, during the normal use of the bicycle, the supporting leg or member 12 is adapted to be engaged in the recess or detent 21. This recess or detent is disposed in substantially a horizontal plane so that the supporting member 12 will be yieldably held in substantially parallel relation with the tubular members 10 and 11. When it is desired to support the bicycle by means of the supporting member 12, the member 12 may be swung downwardly, the downward movement of the supporting member 12 moving this member out of the recess 21 against the tension of the spring 22. At this time the shaft 14 will be moved laterally and when the supporting member 12 is swung downwardly into the recess 20 the shaft 14 will be moved in the opposite direction and the spring 22 will yieldably hold the supporting member 12 in the recess 20. This recess 20 is preferably disposed on a slight inclination to the vertical and during the swinging of the supporting member 12 to an operative position, the supporting member will engage the stop lug 26 which will thus prevent the supporting leg or member 12 from overriding the recess 20.

Through the provision of the dished portion 19 in the ear or plate 16, the upper or inner end of the supporting leg or stand member 12 is adapted to move in and out of the locking detents 20 and 21.

The stand hereinbefore described is adapted to be stamped out of sheet metal of suitable thickness, being so constructed as to substantially eliminate any machining of the device, thus reducing the cost of the device and at the same time providing an entirely practical stand which may be firmly clamped onto the present parts of the bicycle.

What I claim is:

A clamp for a bicycle stand of that type having an adjustable supporting element formed with a spring controlled downwardly inclined inner end portion pivotally connected with the bicycle frame, the combination of an upper axially apertured clamping member of arcuate contour for seating on the top of and having opposed spaced parallel parts intermediate its end for depending between parts of the bicycle frame, a lower clamping member including an upper part formed with an axially apertured concave recess in its upper face and with upstanding parallel spaced flanges on said face for bearing against the bottoms of said frame parts, a front side part depending from the front side of said upper part at an outward inclination and formed respectively in its front face with a concave recess having an axial opening and with an upper and a lower groove disposed in angular relation and extending outwardly from spaced points of the concave recess in said front face and a rear side part depending from the rear side of said upper part in a plane parallel to the plane of and formed with an opening disposed below the opening in such front side part, the walls of said openings in said side parts providing for pivotally connecting said spring controlled end portion with the frame, means coacting with the apertures of said members for clamping the latter to said frame parts, said grooves coacting with said spring controlled end portion for selectively latching said element in adjusted positions, said upper groove being disposed horizontally and said lower groove being inclined to the vertical, and a stop integral with said front side part at one side of the outer end of the said lower groove.

BERRY COHEN.